(12) United States Patent
Alghamdi et al.

(10) Patent No.: US 6,851,892 B2
(45) Date of Patent: Feb. 8, 2005

(54) MARINE IMPACT-ABSORBING STRUCTURE

(75) Inventors: Abdulmalik A. Alghamdi, Jeddah (SA); Abobakr M. Radwan, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 10/361,335

(22) Filed: Feb. 10, 2003

(65) Prior Publication Data

US 2004/0190998 A1 Sep. 30, 2004

(51) Int. Cl.⁷ ................................................. E02D 3/26
(52) U.S. Cl. ..................... 405/211; 405/212; 405/195.1
(58) Field of Search ................................ 405/203–205, 405/211, 211.1, 212–215; 114/219, 264, 265

(56) References Cited

U.S. PATENT DOCUMENTS

| | | | | |
|---|---|---|---|---|
| 3,541,800 A | | 11/1970 | Walker et al. | |
| 3,564,858 A | * | 2/1971 | Pagonowski | 405/212 |
| 3,721,433 A | * | 3/1973 | Sobel | 267/140 |
| 3,842,944 A | | 10/1974 | Shiotani et al. | |
| 3,856,268 A | | 12/1974 | Fitch | |
| 4,058,984 A | * | 11/1977 | Weidler et al. | 405/212 |
| 4,118,014 A | | 10/1978 | Frosch et al. | |
| 4,135,467 A | * | 1/1979 | Loire et al. | 114/219 |
| 4,337,009 A | * | 6/1982 | Jackson | 405/212 |
| 4,337,010 A | * | 6/1982 | Sullaway et al. | 405/227 |
| 4,352,484 A | | 10/1982 | Gertz et al. | |
| 4,398,848 A | | 8/1983 | Guilbeau | |
| 4,492,291 A | | 1/1985 | Chometon et al. | |
| 4,645,375 A | | 2/1987 | Carney, III | |
| 4,880,088 A | | 11/1989 | De Oliveira | |
| 4,958,960 A | * | 9/1990 | Turner et al. | 405/195.1 |
| 4,968,184 A | * | 11/1990 | Reid | 405/225 |
| 5,480,265 A | * | 1/1996 | Marshall et al. | 405/224 |
| 6,178,909 B1 | * | 1/2001 | Palmer | 114/219 |
| 6,276,875 B1 | * | 8/2001 | Gunnar et al. | 405/203 |
| 6,644,893 B2 | * | 11/2003 | Johnson | 405/209 |

* cited by examiner

Primary Examiner—Jong-Suk (James) Lee
(74) Attorney, Agent, or Firm—Abelman, Frayne & Schwab

(57) ABSTRACT

A sacrificial impact-absorbing and energy-dissipating structure for protecting marine facilities from the destructive force of an accidental impact by a marine vessel is constructed from a plurality of inexpensive steel pipes or tubular members that are permanently secured together as by welding to form an open three-dimensional rectilinear framework of plastically deformable material in which the interior of some or all of the tubular members are in fluid communication. One or more of the tubular members forming the structure can be filled with water, a rigid foam material and/or wooden elements that will provide additional energy-dissipation capabilities in the event that the containing tube is subjected to a deforming impact. Optionally, filler ports, discharge ports, pressure relief plugs, and valves can be provided on one or more of the tubular members.

20 Claims, 3 Drawing Sheets

MARINE IMPACT-ABSORBING STRUCTURE

FIELD OF THE INVENTION

This invention relates to protective structures attached to marine facilities, such as docks, quays, off-shore gas and oil well drilling platforms and loading terminals, for absorbing potentially damaging impact forces from large vessels.

BACKGROUND OF THE INVENTION

Large marine vessels, such as cargo ships and crude oil carriers, as well as supply barges and service ships, can inflict considerable impact damage to marine facilities in the event of an unexpected loss of power, or under storm or other adverse weather conditions. Various sacrificial impact-absorbing constructions have been proposed for use in these marine and off-shore environments. For example, U.S. Pat. No. 4,398,848 discloses a marine barrier of open tubular construction that is supported by deformable shock-absorbing members. However, the open network tubular frame construction is of metal pipes of various diameters, including those that are relatively small and having little impact energy dissipation capacity. The frame is not meant to be the principal energy absorbing element of the combined structure. There does not appear to be any suggestion that the pipes forming the barrier be filled with any material, or that the tubular barrier construction is to be destructively deformed in order to protect the supporting facility from impact with the vessel. Rather, a series of telescoping cylinders having an internal linking membrane and exterior collar function as axially pivoting shock absorber assemblies. An impact at one position along the horizontally-extending tubular barrier is transmitted to all of the absorbing elements to dissipate the force. The structure disclosed in U.S. Pat. No. 4,398,848 has a limited capability for absorbing an impact that is severe enough to destructively deform the framework. In fact, if the frame members are deformed, the shock absorbing members may be disabled.

It is therefore an object of this invention to provide a sacrificial impact-absorbing structure and methods for its construction that can be secured to marine facilities to protect them from damaging impacts of large vessels.

It is another object of this invention to provide a protective structure for use in the marine environment that will undergo plastic deformation throughout its construction in order to provide the maximum energy absorption in the event of an impact by a marine vessel.

A further object of the invention is to provide an impact-absorbing structure that is reliable, relatively simple in design and economical to construct.

SUMMARY OF THE INVENTION

The above objects and other advantages are provided by the present invention in which a novel impact-absorbing barrier is constructed from a plurality of tubular members of uniform cross sectional configuration to provide a three-dimensional rectilinear structure. In a preferred embodiment, an individual unit of construction comprises tubular members of uniform length that form the framework of an open cube.

In yet a further preferred embodiment of the invention, one or more tubular cross members are installed diagonally within the three-dimensional rectilinear or cubic framework to receive and dissipate anticipated impact forces. The one or more diagonal reinforcing struts can extend from one corner of the face to an opposite diagonal corner that is in the same sidewall plane; or the strut can extend from one corner of the front face diagonally through the interior to a corner in the opposite face.

In a particularly preferred embodiment, the tubular members are of circular cross-section. Carbon steel pipes are readily available and inexpensive. Other commercially available shapes, such as square and rectilinear tubing, can also be used. However, a round pipe offers advantages in maximizing energy-absorbing capacity when plastically deformed under destructive impact.

The tubing can have an outside diameter of from about 6 inches to 15 inches (14 cm to 30 cm) and have a wall thickness of from about 0.125 inches to 0.5 inches (3 mm to 13 mm). The tubing can be fabricated from carbon steel or similar material. The tubing should be of a material that can be cut and easily welded to facilitate assembly of the deformable barrier.

In one preferred embodiment, the internal space defined by the interior of the tubes comprising the assembled structure is interconnected, that is, the interior space on one tube is in fluid communication with that of some or all of the tubes to which it is joined. The internal fluid communication of this configuration is provided by cutting openings in the tubes prior to, or during the assembly of the tubes.

One or more of the tubes are optionally filled with an impact-absorbing medium. The filler medium can be a rigid polymeric foam material, such as a polyurethane formaldehyde foam or other such material.

One or more of the tubes can also be filled with water and the tubes provided with pressure relief orifices that are closed by plugs that rupture or are released from their fitting when the increased pressure of an impact is transmitted through the essentially incompressible water. The number and size of the pressure relief orifices is predetermined in order to optimize the energy dissipation offered by the structure. Different members of the structure can have none, one or a plurality of orifices of varying size and pressure relief values so that they begin discharging water at different times following impact and the destructive, energy-dissipating crushing of the structure's framework. The wall of an empty tube can also be provided with one or more orifices to permit water to pass from an adjacent tube that is filled with water.

Submerged elements of the sacrificial impact-absorbing structure can be provided with small open ports to allow one or more of the tubes to fill with water that are submerged after installation on the facility to be protected. Rupture plugs and/or large pressure relief parts are optionally provided as described above.

In order to fill the tubes with an expandable rigid foam composition or with water, one or more filler ports are provided in the tubes at appropriate locations. In the embodiment where the interior of the tubes are not interconnected and in fluid communication with each other, selected tubes can be filled based on the predetermined direction(s) of probable maximum impact. For example, where a docking or tie-up platform is typically approached by barges or service ships from one direction, the impact zone and likely force vectors can be calculated, and from this information the corresponding force vectors transmitted to and through the impact-absorbing structure are determined. Thus, where the maximum impact force vector is normal to the protected facility, tubes parallel to that vector are filled with a supplemental energy-absorbing medium that will serve to further dissipate the energy of impact as the containing tube is crushed or otherwise plastically deformed.

The tubes can also be filled with a solid material such as wood. The wood can be in the form of new or used pilings, railroad ties or timber, or even smaller scraps or chips that are firmly packed into one or more of the tubes prior to assembly, but which will compress with resistance if the containing tube is deformed. A combination of rigid foam and unconsolidated wood filler material can be employed to minimize costs.

In order to facilitate the plastic deformation of the tubular members that have been predetermined to be generally aligned with the force vectors of potential maximum impact, these members can be formed of a tube having a lesser wall thickness than the tubes to which it is joined at right angles. Similarly, in the structure containing optional diagonal struts, the struts can have a wall thickness that is less than the members positioned normal to the anticipated force vectors.

In another preferred embodiment, reinforcing elements are utilized to strengthen the joint between an outside member and a member that extends in the same direction as the expected maximum force vector. The reinforcing elements serve to maintain the integrity of the welded joint so that the hull of a barge or ship will not be punctured by the end of a pipe that separates at a weld joint during an impact.

The improved structure of the invention can be attached to an offshore or other marine facility using conventional methods and hardware known to the art. Means of attachment include welding to steel supporting legs of off-shore drilling platforms, bolted bracket assemblies, steel cables, and the like.

BRIEF DESCRIPTION OF THE DRAWINGS

The invention will be further described below and with reference to the attached drawings in which.

DETAILED DESCRIPTION OF THE INVENTION

Figure 1:
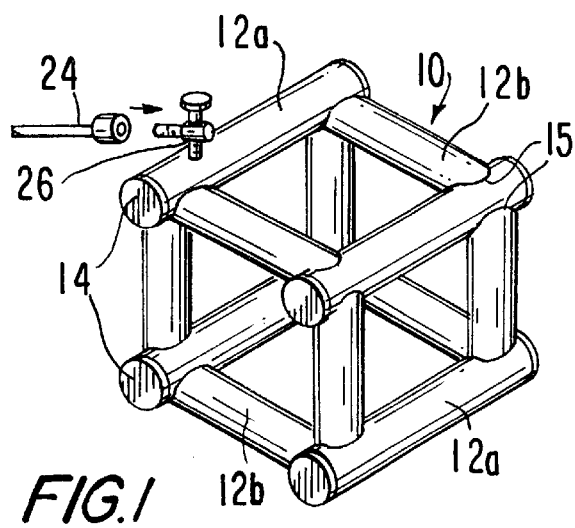
FIG. 1 is a perspective view of one embodiment of an impact-absorbing unit or cell constructed in accordance with the invention.

The invention will be further described with reference to the attached drawings where FIG. 1 schematically illustrates one embodiment of the invention in the form of a cubic impact-absorbing framework 10 formed of tubes referred to generally as 12, having a circular cross section. Tubes 12a are provided with sealed exposed end caps 14. Tubes 12b are cut at their respective ends 15 to conform to the outer contour of tubes 12a. In this preferred embodiment, the tubes 12a and 12b are of the same cross-section and diameter adding to the overall impact-absorbing capability of the framework structure. However, the invention also comprehends the use of tubes of different cross-sections and dimensions assembled to form the impact-absorbing framework.

Figure 2:
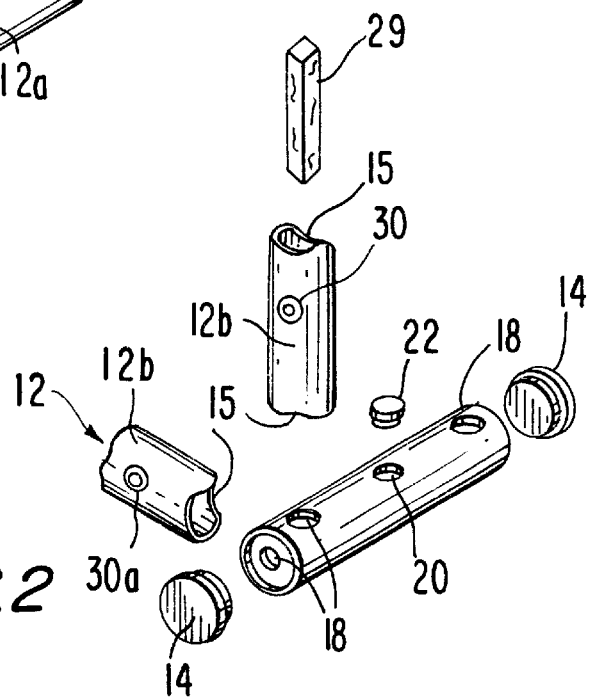
FIG. 2 is an exploded view of the embodiment of FIG. 1.

With reference to the exploded view of FIG. 2, there is illustrated an embodiment where openings 18 are cut in tubes 12a to provide fluid communication throughout the interior space defined by the unit or cell 10. In the embodiment of FIG. 2, several of the tubes 12a and 12b are provided with filling ports 20 at predetermined locations to receive a flowable fluid, such as water, and/or an expandable rigid foam composition. The inlet port 20 can be a threaded plug 22, a valve 26 with threads to receive a hose fitting 24, or the like. As also illustrated in FIG. 2, one or more of the tubes 12 can be provided with one or a plurality of pressure relief or blow-off fittings 30. As explained above, these fittings are optionally employed where one or more of the tubes is filled with an incompressible fluid, such as water, that will function to slow the rate of crushing or other deformation of the tubes 12. The larger fittings 30a are provided to permit the rapid discharge of water to minimize the likelihood that the tube 12 will rupture along a longitudinal seam, thereby diminishing its energy-absorbing capacity, and perhaps the integrity of the associated framework structure.

It is also to be understood that selected tubes 12 in the unit structure 10 can be isolated and filled with different energy-absorbing materials, e.g., rigid foam, water, wood, and the like. In the embodiment illustrated in FIG. 2, where wood in the form of a used piling 29 is employed, the piling is cut to length to fit closely in either a tube 12a or 12b, one end of which has either been sealed with a cap 14 or joined by welding to another tube. Once the piling has been inserted into the tube 12b, the tube is either capped or welded to another tube. One or more of the tubes provided with a wooden filler can optionally be filled with water or rigid foam.

Figure 3:
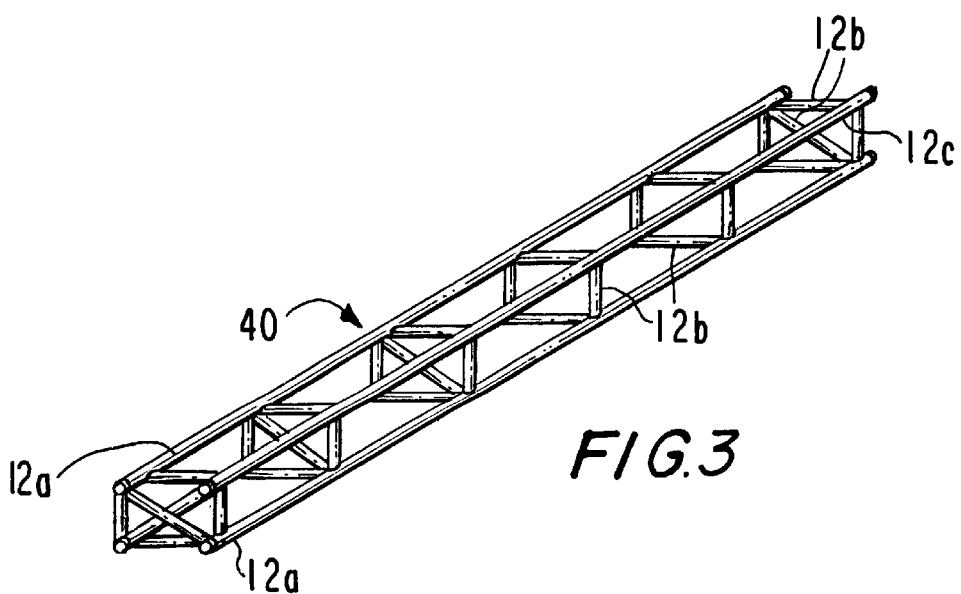
FIG. 3 is a view similar to FIG. 1, but of another embodiment of the invention.
Figure 1A:
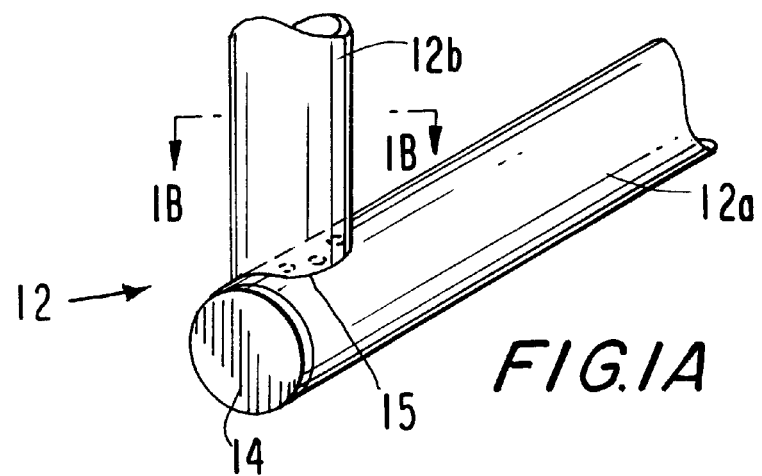
Figure 1B:
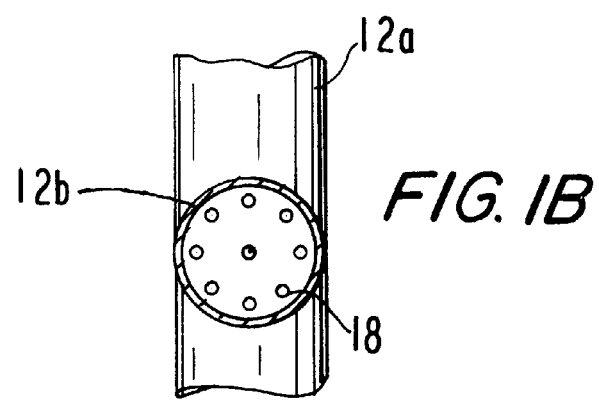

With reference to FIG. 3, there is shown a further embodiment of the impact-absorbing structure 10 in which a plurality of cells form an elongated rectilinear framework 40 comprised of four cylindrical tubes 12c joined by tubes 12b. As in the above construction, tubes 12c are sealed with caps 14. Diagonal tubular struts 44 are installed at the ends and struts 46 internally of the structure.

Figure 4:
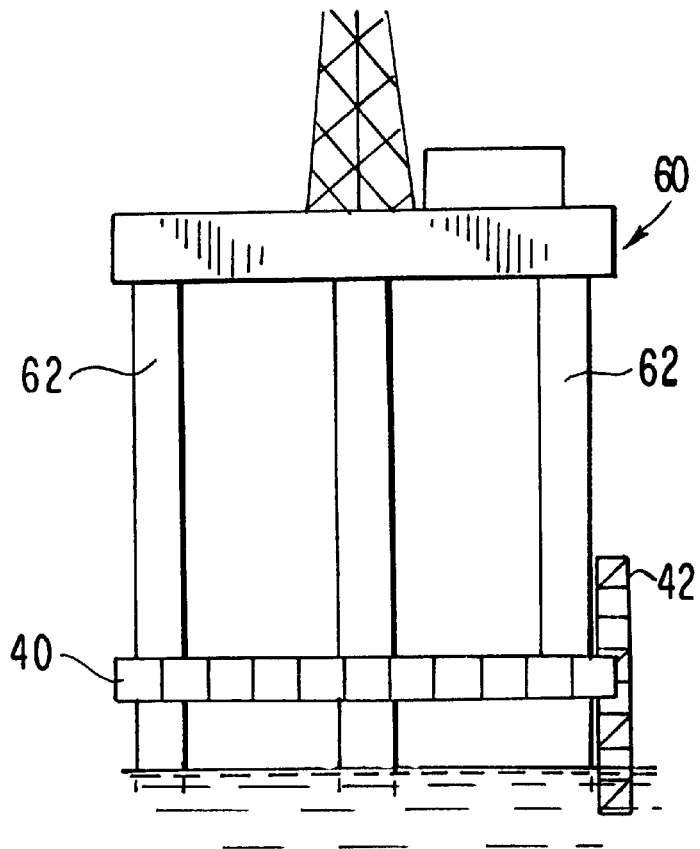
FIG. 4 is an illustration of a further embodiment of the invention installed to protect an off-shore docking facility.

A marine facility installation of an impact-absorbing framework of the invention is illustrated in FIG. 4. In this installation, an elongated framework 40 similar to that of FIG. 3 is mounted on the faces of two vertical columns 62 of an off-shore platform 60 to absorb the impact of an empty crude oil carrier riding high in the water. A plurality of smaller units 42 are secured in a vertical array to an adjacent docking location for receiving supply barges and service vessels.

Figure 5:
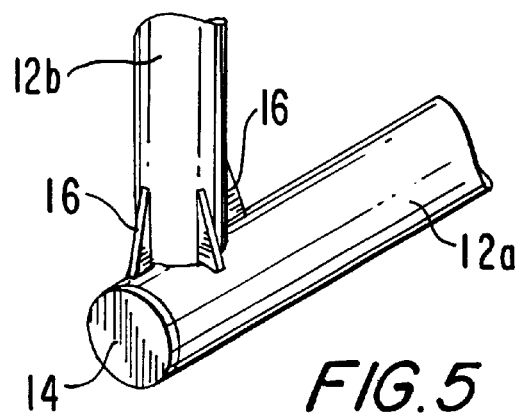
FIG. 5 is an illustration of a reinforced joint.

With reference to FIG. 5, there is shown a further preferred embodiment in which a number of reinforcing elements 16 are welded to tubular members 12a and 12b to strengthen the joint and minimize the likelihood that an end of the tube 12b would be broken free from tube 12a to project into the hull of a ship or barge during an accidental impact.

The following examples will further illustrate the methods and materials of construction in accordance with the present invention.

EXAMPLE 1

A three-dimensional unit impact-absorbing structure of the type illustrated in FIG. 1 is constructed on a cubic model in which length of each side is about 10 ft./3 m. A mild steel pipe of circular cross-section that is 12 inches/30 cm in diameter and having a wall thickness of ¼ inches/½ cm is used. Several of the individual tubes are provided with cut-outs in their side walls near a tube that will be welded at that location. Before welding end caps in place, a length of used piling is inserted in the tube. The tubes extending normal to the marine facility on which this unit structure will be placed are provided with openings in which filler valves are installed. The same tubes are provided with pressure relief blow-out plugs to release the hydraulic pressure at a predetermined value.

EXAMPLE 2

An elongated three-dimensional sacrificial impact-absorbing structure of the type schematically illustrated in FIG. 3 is constructed from four tubular members of circular cross-section that are 10 ft/3 meters long, 6 inches/15 cm in diameter and having a wall thickness of ⅛ inches/¼ cm. A thinner-walled tubing, 1/12 inches/⅕ cm thick is cut to a nominal length of 3 ft/1 m to form the remaining elements, including the diagonal struts that extend in the plane of the internal region defined by the sidewall. The ends of the shorter connecting elements are cut to the contour of the longer longitudinal elements in preparation for welding. The elements 12c that extend in the same general direction as the anticipated maximum force vector of an accidental impact are filled with scrap lumber and timbers of random length. They are subsequently filled with a rigid formaldehyde foam via previously installed fittings to provide additional resistance to the plastic deformation of the tubular steel elements in the event of an impact. The placement of these reinforcing elements between the longer elements that will first receive the impact will serve to minimize damage to the hull of a barge or ship in the event of an accidental impact.

As will be apparent from the above description of the invention and examples, various modifications and changes in construction methods and materials can be made to the structure without departing from the spirit and scope of the invention as set forth in the claims that follow.

We claim:

1. A structure comprising a plurality of tubular members permanently secured together to provide a sacrificial impact-absorbing structure for mounting on a marine facility to protect the facility from damage by the destructive force of an accidental impact by a marine vessel, the tubular members being a plastically deformable material, the impact absorbing structure defining an open three-dimensional rectilinear framework, whereby the kinetic energy of an impact by a marine vessel is absorbed by the plastic deformation of one or more of the tubular members.

2. The structure of claim 1, wherein the tubular members are steel and are secured together by welding.

3. The structure of claim 1, comprising twelve of the tubular members secured together.

4. The structure of claim 1, wherein internal spaces defined by at least a portion of the plurality of tubular members are in fluid communication.

5. The structure of claim 4 which further comprises one or more fluid inlet ports.

6. The structure of claim 5 which further comprises one or more pressure relief devices communicating with the interior space defined by one or more of the tubular members, whereby pressure transmitted through a fluid by the deformation of the structure is releasable.

7. The structure of claim 6, wherein the pressure relief devices are actuated at a predetermined pressure transmitted internally of the tubular member.

8. The structure of claim 7, wherein a plurality of the pressure relief devices having different predetermined actuation pressures are installed on one or more of the tubular members.

9. The structure of claim 1, wherein the interior of the one or more tubular members is occupied by a material selected from the group consisting of water, a rigid expanded foam composition, wood and a combination of these materials.

10. A structure comprising four elongated tubular members permanently secured together by a plurality of substantially shorter connecting tubular members to provide a sacrificial impact-absorbing and energy-dissipating structure for mounting on a marine facility to protect the facility from damage by the destructive force of an accidental impact by a marine vessel, the tubular members being formed from a plastically deformable material, the impact-absorbing and energy-dissipating structure defining an open three-dimensional rectilinear framework, whereby the kinetic energy of an impact by a marine vessel is absorbed in the plastic deformation of one or more of the tubular members.

11. The structure of claim 10 in which the elongated members are of substantially equal length.

12. The structure of claim 10, wherein the outside diameter and wall thickness of all of the tubular members are the same.

13. The structure of claim 10, wherein four of the connecting tubular members are secured to the four elongated tubular members to define a plane.

14. The structure of claim 10, wherein the tubular members are steel and are secured together by welding.

15. The structure of claim 14 which further includes one or more reinforcing elements secured to a juncture where the tubular members are joined.

16. The structure of claim 10, wherein internal spaces defined by two or more of the tubular members comprising the structure are in fluid communication.

17. The structure of claim 16, wherein the fluid communication is provided by a single opening in a first tubular member at its juncture with a second member.

18. The structure of claim 16, wherein the fluid communication is provided by a plurality of openings formed in a first tubular member at its juncture with a second member.

19. The structure of claim 16, wherein one or more of the tubular member contains water.

20. The structure of claim 10, wherein one or more of the tubular members include ports for admitting fluids into, and discharging fluids from the structure.

* * * * *